United States Patent
Schwartz

(10) Patent No.: US 11,763,635 B2
(45) Date of Patent: Sep. 19, 2023

(54) SOCIAL DISTANCING IN GAMING ESTABLISHMENTS

(71) Applicant: Global Payments Gaming Services Inc., Las Vegas, NV (US)

(72) Inventor: Andrew J. Schwartz, Las Vegas, NV (US)

(73) Assignee: Global Payments Gaming Services Inc., Las Vegas, NV (US)

( * ) Notice: Subject to any disclaimer, the term of this patent is extended or adjusted under 35 U.S.C. 154(b) by 105 days.

(21) Appl. No.: 17/318,284

(22) Filed: May 12, 2021

(65) Prior Publication Data

US 2021/0358269 A1 Nov. 18, 2021

Related U.S. Application Data

(60) Provisional application No. 63/023,974, filed on May 13, 2020.

(51) Int. Cl.
 G07F 17/32 (2006.01)
 H04W 4/80 (2018.01)
 H04W 4/21 (2018.01)

(52) U.S. Cl.
 CPC ...... G07F 17/3283 (2013.01); G07F 17/3223 (2013.01); H04W 4/21 (2018.02); H04W 4/80 (2018.02)

(58) Field of Classification Search
 None
 See application file for complete search history.

(56) References Cited

U.S. PATENT DOCUMENTS

| | | | | |
|---|---|---|---|---|
| 10,991,208 B1 * | 4/2021 | Dutt | .................... | G07F 17/3281 |
| 11,024,116 B1 * | 6/2021 | Hoehne | ............... | G07F 17/3227 |
| 2020/0334945 A1 * | 10/2020 | Perea-OcHoa | ..... | G07F 17/3276 |
| 2021/0350661 A1 * | 11/2021 | Hoehne | ............... | G07F 17/3244 |

* cited by examiner

*Primary Examiner* — Sunit Pandya
(74) *Attorney, Agent, or Firm* — Mendelsohn Dunleavy, P.C.; Steve Mendelsohn

(57) ABSTRACT

In certain embodiments, social distancing is implemented at a gaming establishment (such as a casino) by disabling one or more neighboring gaming machines from being played while a first patron is playing at a first gaming machine. Social grouping is implemented by enabling a second patron who is in a social group with the first patron to play at one of the neighboring gaming machines, while the first patron is playing at the first gaming machine. In some implementations, a gaming system of the gaming establishment controls which gaming machines are disabled. In other implementations, patrons' cell phones running a gaming app communicate directly with the gaming machines to disable the neighboring gaming machines while enabling patrons in the same social group to play at neighboring gaming machines. In some implementations, play at a gaming machine is prevented by temporarily disabling the gaming machine's bill validator.

21 Claims, 8 Drawing Sheets

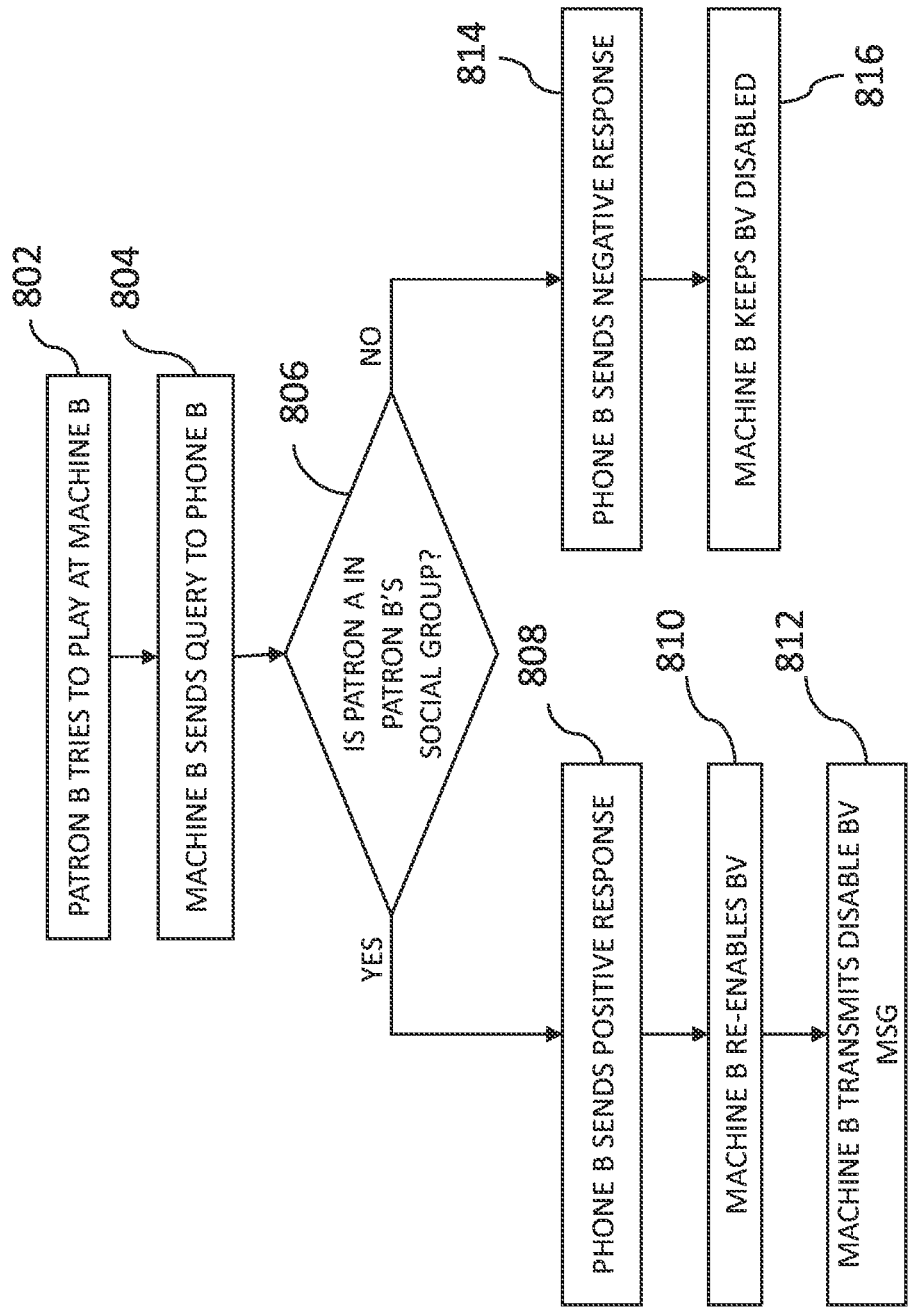

SOCIAL DISTANCING IN GAMING ESTABLISHMENTS

CROSS-REFERENCE TO RELATED APPLICATIONS

This application claims the benefit of the filing date of U.S. provisional application No. 63/023,974, filed on May 13, 2020, the teachings of which are incorporated herein by reference in their entirety.

The subject matter of this disclosure is related to the subject matter of U.S. Pat. Nos. 8,845,416, 10,825,292 ("the '292 patent"), and U.S. patent application Ser. No. 17/029,899 ("the '899 application"), the teachings of all of which are incorporated herein by reference in their entirety.

BACKGROUND

Field of the Invention

The present invention relates to technology for maintaining appropriate social distancing in casinos and other gaming establishments.

Description of the Related Art

This section introduces aspects that may help facilitate a better understanding of the invention. Accordingly, the statements of this section are to be read in this light and are not to be understood as admissions about what is prior art or what is not prior art.

In light of the Covid-19 virus pandemic, it is important to maintain appropriate physical separation between individuals to reduce the spread of the virus, referred to as social distancing. Casinos and other gaming establishments are introducing techniques for maintaining proper social distancing between their patrons. For example, some casinos are removing every other gaming machine (e.g., slot machine or poker machine) in each row of machines in the casino and the associated chairs to attempt to keep patrons separated. Such drastic measures are expensive to implement and even more expensive to reverse if and when social distancing is no longer needed.

BRIEF DESCRIPTION OF THE DRAWINGS

Embodiments of the invention will become more fully apparent from the following detailed description, the appended claims, and the accompanying drawings in which like reference numerals identify similar or identical elements.

FIG. 8 is a flow diagram of the processing performed according to one possible implementation of social grouping.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

The '292 patent and the '899 application describe distributed gaming systems that allow casino patrons to purchase gaming credit at gaming machines using specially designed applications (referred to herein as the "gaming apps") on their cell phones and other wireless devices. According to the current disclosure, those gaming systems and those gaming apps are modified to support social distancing between patrons in a casino.

Casino System with Tokenized Transaction Packages

Figure 1:
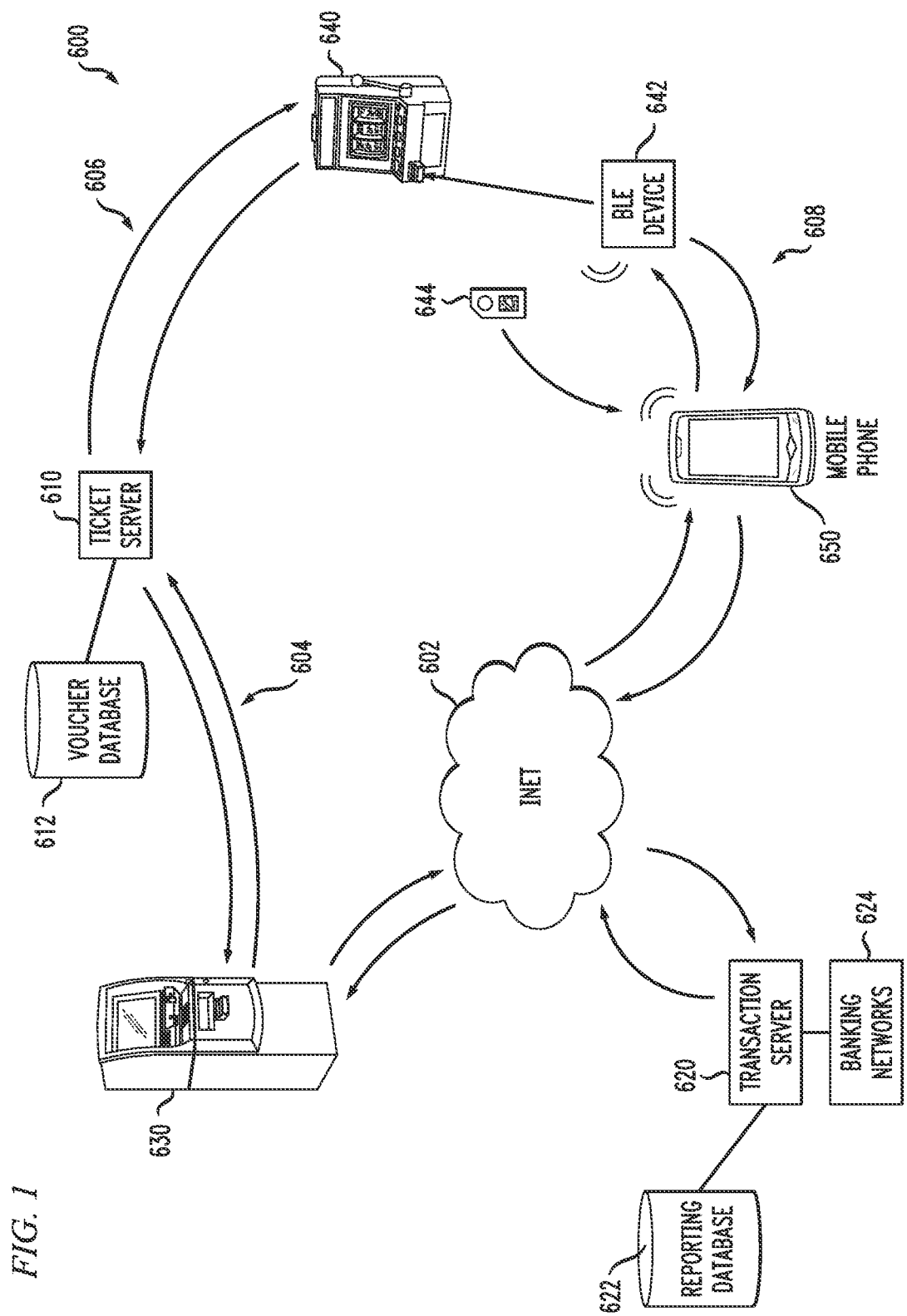
FIG. 1 shows a symbolic diagram representing a distributed gaming system for a casino or other suitable gaming establishment that supports gaming vouchers, according to another possible embodiment.
Figure 6:
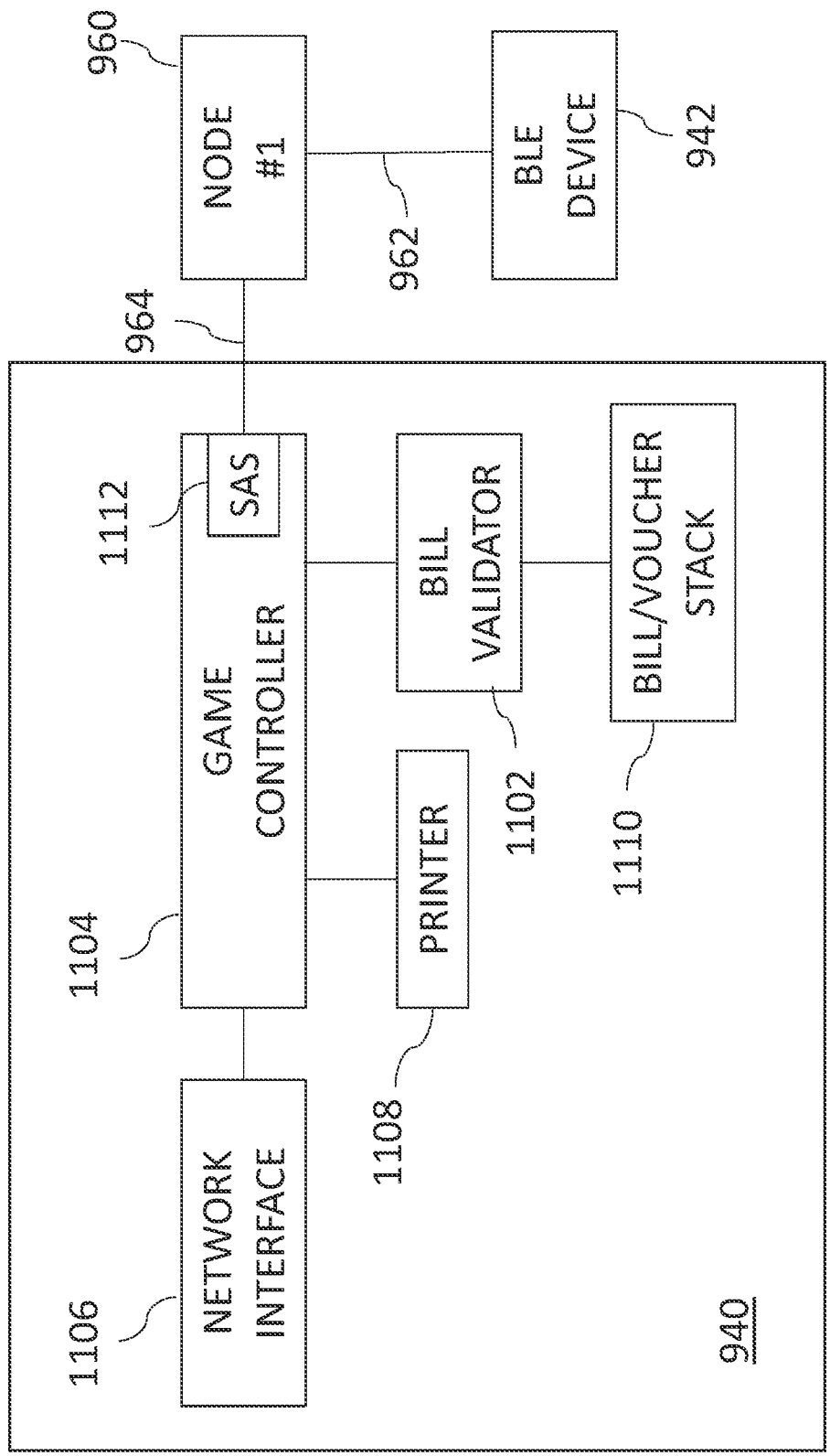
FIG. 6 is a simplified block diagram of the gaming machine of FIG. 4

FIG. 1, which is equivalent to FIG. 6 in the '292 patent, shows a symbolic diagram representing a distributed gaming system 600 for a casino or other suitable gaming establishment that supports gaming vouchers. As used herein, the term "gaming voucher" refers generically to both conventional paper vouchers and virtual vouchers.

In certain implementations, the gaming system 600 is a retrofit gaming system based on a legacy gaming system that was originally designed to support paper vouchers, but not virtual vouchers, and which has been upgraded to support the functionality described below. In particular, the gaming system 600 of FIG. 1 has a legacy ticket server 610 that maintains an associated legacy voucher database 612, a transaction server 620 that maintains an associated reporting database 622, one or more instances of kiosk 630, and one or more (and typically many) instances of gaming machine 640, each having a Bluetooth low energy (BLE) peripheral device 642 and a unique tag 644. Note that, as far as the technology is concerned, the ticket server 610 and/or the transaction server 620 need not be physically located on the casino premises, although legal regulations often require at least the ticket server 610 to be physically located on the casino premises.

In certain other implementations, the gaming system 600 is provisioned with original OEM (original equipment manufacturer) components that were originally designed and built to support the functionality of system 600 described herein.

Also shown in FIG. 1 are the cell phone 650 of a casino patron and banking networks 624, all of which communicate with various components of the gaming system 600, but which are themselves not considered to be part of that system. The cell phone 650 runs a specially designed cell-phone gaming app that supports the functionality described in this specification associated with the gaming system 600. When the specification describes certain operations performed by the patron's cell phone 650, it should be understood that those operations are performed by the gaming app running on that cell phone. Although the gaming system 600 is described in the context of the cell phone 650, those skilled in the art will understand that the gaming system 600 can operate with any suitable wireless device, such as (without limitation) a cell phone, a tablet, a laptop computer, a smart watch, a fitness tracker, a smart band, a smart medallion, or a smart key fob.

The ticket server 610/voucher database 612 may be any suitable legacy ticket server/voucher database for casinos, including (without limitation) an EZ Pay ticket server from IGT of Reno, Nev.; an SDS, SDG, or ACSC ticket server from Bally Technologies Inc. of Enterprise, Nev.; a SYN-KROS ticket server from Konami Gaming, Inc., of Las Vegas, Nev.; or an Oasis ticket server from Aristocrat Technologies, Inc., of Las Vegas, Nev. The ticket server 610 creates a gaming voucher by assigning a unique voucher ID to a specified monetary value and storing the voucher ID and the monetary value for the gaming voucher as related entries in a table of the voucher database 612. In certain implementations of the gaming system 600 of FIG. 1, there is no distinction made between paper vouchers and virtual vouchers; they are all just gaming vouchers. There are no paper voucher IDs having a common subfield value that identifies those voucher IDs as being associated with paper vouchers and no virtual voucher IDs having a different, common subfield value that identifies those voucher IDs as being associated with virtual vouchers. Rather, there are only gaming vouchers created and stored by the legacy ticket server 610 in the same way as legacy paper vouchers.

The kiosk 630 may be based on any suitable kiosk designed for casinos, including (without limitation) an LSK series kiosk from Global Payments Gaming Services, Inc., of Las Vegas, Nev.; an Everi kiosk from Everi Holdings Inc. of Las Vegas, Nev.; an M3T kiosk from M3 Technology Solutions, LLC, of Norman, Okla.; or a suitable kiosk from any of NRT Technology Corp. of Canada; Glory Global Solutions Limited of Japan; Automated Systems America, Inc., of Glendale, Calif.; or Diebold Nixdorf, Inc., of North Canton, Ohio. Depending on the particular implementation, the kiosk 630 may be based on a legacy kiosk whose software has been upgraded to support the functionality of system 600 or the kiosk 630 may be a new OEM kiosk that was originally designed and built to support that functionality.

The gaming machine 640 may be based on any suitable gaming machine for casinos, including (without limitation) a suitable gaming machine from any of IGT of Reno, Nev.; Scientific Games Corporation of Las Vegas, Nev.; Aristocrat Technologies, Inc., of Las Vegas, Nev.; Konami Gaming, Inc., of Las Vegas, Nev.; Ainsworth Game Technology Inc. of Las Vegas, Nev.; or Everi Holdings Inc. of Las Vegas, Nev. Here, too, depending on the particular implementation, the gaming machine 640 may be based on a legacy gaming machine that has been upgraded to support the functionality of system 600 (as described further below) or the gaming machine 640 may be a new OEM gaming machine that was originally designed and built to support that functionality.

Depending on the implementation, the tag 644 has associated with it a unique tag identification (ID) value. The tag 644 may be affixed to or mounted onto an outer surface of the gaming machine 640, e.g., on or near the input panel or mounted inside the gaming machine 640 itself, e.g., behind or near the input panel. The tag 644 may be (i) an optically readable tag that represents the tag ID using an optically readable code symbol, such as (without limitation) a one-dimensional barcode or a two-dimensional QR code, or (ii) a wirelessly readable tag, such as (without limitation) an RFID or NFC tag, that wirelessly transmits the tag ID, or any other suitable means for conveying the tag ID to the cell phone 650. Depending on the particular type of wireless tag used, the reading of the tag 644 by the cell phone 650 may involve two-way wireless communication (e.g., a query by the cell phone 650 followed by a response by the tag 644) or one-way wireless communication (e.g., the cell phone 650 detecting a beacon transmitted by the tag 644).

When the tag 644 is an optically readable tag, the cell phone 650 is able to optically read the code symbol to determine the tag ID. When the tag 644 is a wirelessly readable tag, the cell phone 650 is able to receive and process a wireless signal transmitted by the tag 644 to determine the tag ID. In either case, the tag ID uniquely identifies and distinguishes the gaming machine 640 from all other gaming machines in the casino, each of which is analogous to the gaming machine 640 and has its own unique tag. Note that the tag 644 may be both an optically readable tag having a code symbol representing the tag ID and a wirelessly readable tag that transmits a wireless signal representing that same tag ID.

As indicated in FIG. 1, various other elements of the gaming system 600 are able to communicate with one another via suitable wireline and/or wireless links. For example, the cell phone 650 and the kiosk 630 are each able to communicate with the transaction server 620 via the wireless network 602, which can be a conventional Bluetooth network or other suitable wireless network. In some implementations, the wireless network 602 is a private wireless network designed and configured to handle the expected volume of wireless communications within the gaming system 600. The transaction server 620 is also capable of communicating with the one or more banking networks 624 via suitable wireline and/or wireless links. The ticket server 610 is able to communicate with both the kiosk 630 and the gaming machine 640 via suitable wireline or wireless links 604 and 606, respectively. The cell phone 650 is also able to communicate wirelessly via BLE communication link 608 with the gaming machine's BLE peripheral device 642, which, as described further below, is electrically connected to the gaming machine 640. Although the BLE peripheral device 642 is a wireless transceiver designed to communicate with the cell phone 650 via the Bluetooth low-energy link 608, in other implementations, other suitable wireless transmission protocols may be employed, such as (without limitation) NFC (near-field communication), Bluetooth, WiFi, ZigBee, or optical protocols.

The gaming system 600 enables a patron to use his cell phone 650 to request and facilitate the transfer of gaming credit (i.e., funds) corresponding to a specified monetary value to the gaming machine 640 selected by the patron to enable the patron to play the gaming machine 640 without having physically to insert into the gaming machine, money or other financial transaction means such as (without limitation) a paper TITO ticket, a player card, a credit/debit bank card. Note that, in some implementations, as described below and unlike a conventional virtual or electronic wallet (aka e-wallet), at no time during this process, do the funds associated with the gaming credit ever reside on the cell phone 650 itself or in an account associated with the patron. Moreover, at no time does the cell phone 650 or the patron have access to the voucher ID of any gaming voucher purchased by the patron or on behalf of the patron using the cell phone 650.

Prior to the operations associated with an individual transfer of gaming credit to the patron's selected gaming machine 640, the patron registers with the transaction server 620, which creates a user profile for the patron in the reporting database 622. In some implementations, the user profile includes a unique user ID associated with the patron, a unique cell phone ID associated with the patron's cell phone 650, information regarding one or more funding sources (for example, without limitations, credit or debit card bank accounts, existing gaming vouchers stored in the voucher database 612, or an e-wallet) for the patron, and authentication information for the patron (for example, without limitation, a PIN (personal identification number), finger print, thumb print, voice print, face print, retina print, transaction DNA, block chain, token, and/or certificate associated with the patron).

The transaction server 620 also maintains in the reporting database 622, for each registered patron, a transaction ledger that documents the transactions performed by the patron using the cell phone 650, where, for each transaction, the transaction ledger includes the voucher ID of the gaming voucher created for the transaction, the monetary value of the transaction, the type of the transaction (e.g., crediting a gaming machine vs. other types of transactions), a date-and-time stamp for the transaction, and a location associated with the transaction (e.g., the tag ID of the gaming machine's tag 644). With at least one viable funding source registered with the transaction server 620, the patron is able to use his cell phone 650 to have gaming credit transferred to the gaming machine 640 for use by the patron to play the gaming machine's game, according to the processing described below. When the patron's user profile identifies multiple funding sources, the patron can use the cell phone 650 to select a default funding source and be queried by the transaction server 620 to select a different funding source if the default funding source is deficient.

Figure 2:
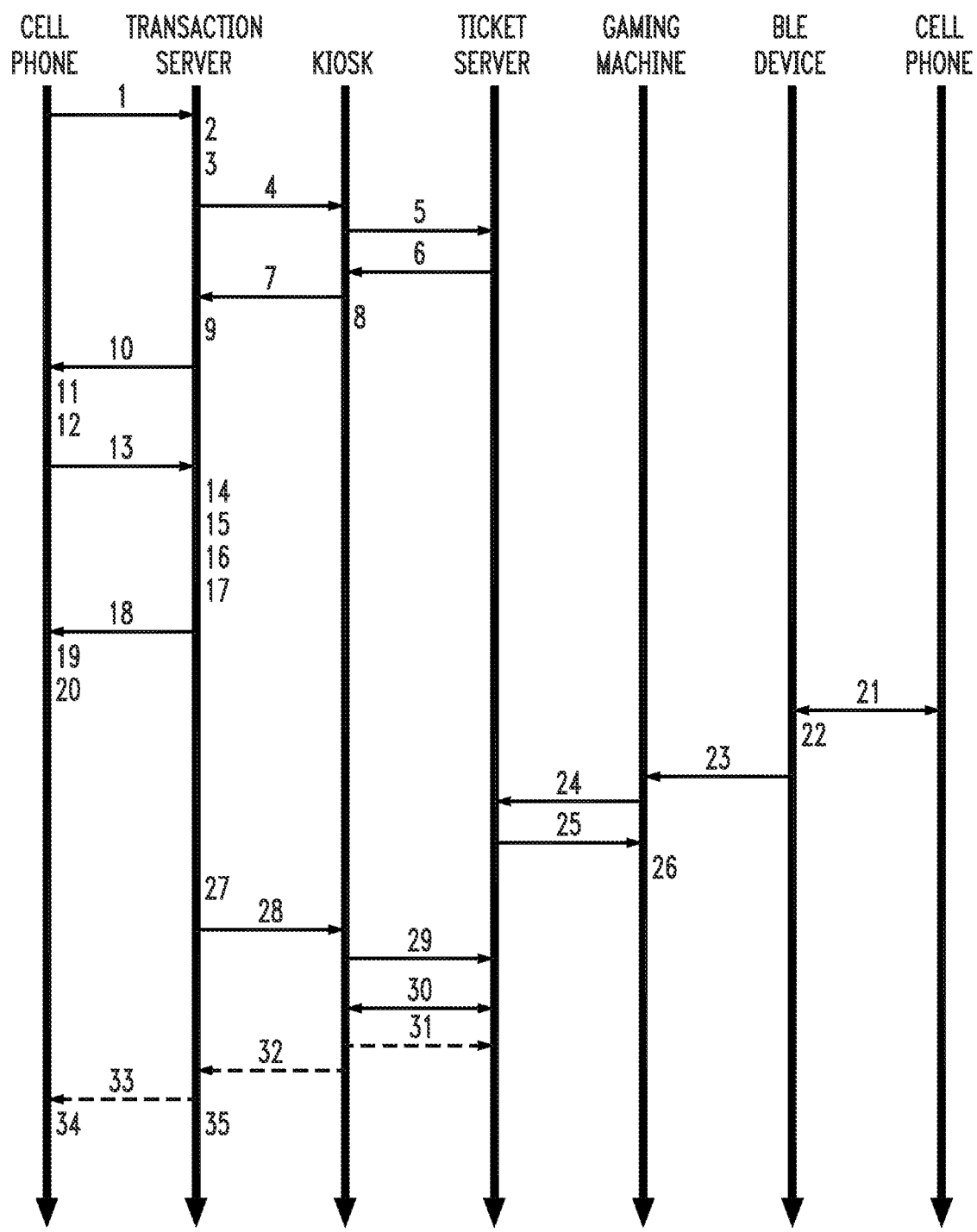
FIG. 2 is a diagram representing the steps involved in the purchase by a patron of gaming credit at the gaming machine of the gaming system of FIG. 1, according to one possible implementation.
Figure 7:
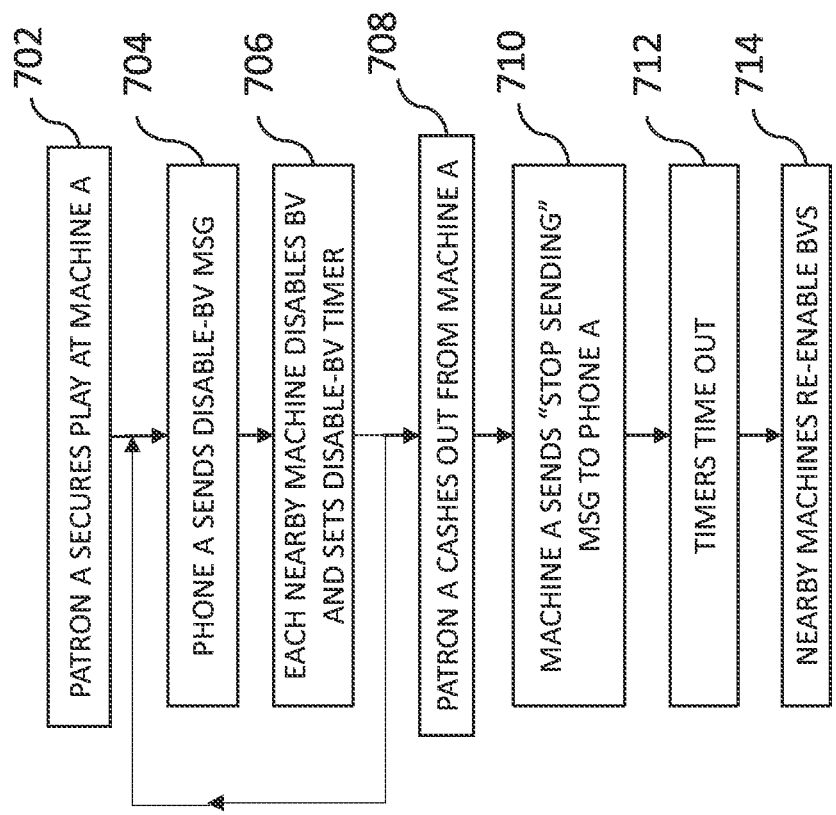
FIG. 7 is a flow diagram of the processing performed according to one possible implementation of social distancing.

FIG. 2, which is equivalent to FIG. 7 in the '292 patent, is a diagram representing the steps involved in the purchase by a patron of gaming credit at the gaming machine 640 of the gaming system 600 of FIG. 1, according to one possible implementation.

At step 1, the patron uses the gaming app on his cell phone 650 to transmit a gaming-credit purchase request via the wireless network 602 to the transaction server 620 to begin the process of having gaming credit transferred to a to-be-specified gaming machine on behalf of the patron. The purchase request includes the cell phone ID, the desired monetary value of the requested gaming credit, and authentication information for the patron.

At step 2, the transaction server 620 accesses the patron's user profile in the reporting database 622 using the received cell phone ID and determines whether to authorize the patron's purchase request by (i) comparing the received authentication information with the patron's authentication information stored in the patron's user profile and (ii) determining whether the requested monetary value is acceptable (e.g., within specified limits previously established by and/or for the patron).

Assuming that the purchase request is authorized, at step 3, the transaction server 620 creates a new transaction record in the patron's transaction ledger in the reporting database 622 for the new transaction and records the monetary value in the new transaction record. The transaction server 620 assigns a unique transaction ID that contains the patron's user ID and stores that transaction ID in the transaction record. Assigning a unique transaction ID associated with each transaction associated with the cell phone's unique ID enables the transactions to be uniquely batched and tracked using duplicate ledgers, where batch handling and backups can be continuously updated and appended without duplication.

At step 4, the transaction server 620 transmits a kiosk voucher request via the wireless network 602 to the kiosk 630, where the kiosk voucher request includes the transaction ID and the monetary value.

At step 5, the kiosk 630 receives the kiosk voucher request and transmits a ticket-server voucher request via the communication link 604 to the ticket server 610, where the ticket-server voucher request includes (at least) the monetary value and a local date-and-time stamp. Those skilled in the art will understand that some ticket servers may require additional information, such as (without limitation) a unique kiosk ID associated with the kiosk 630. The kiosk 630 maintains a voucher-request ledger that maps the kiosk voucher request received from the transaction server 620 to the ticket-server voucher request that the kiosk 630 sent to the ticket server 610.

At step 6, upon receiving the ticket-server voucher request from the kiosk 630, the ticket server 610 creates a new gaming voucher having the monetary value specified in the ticket-server voucher request, by (i) assigning a unique voucher ID, (ii) storing the voucher ID, the monetary value, the date-and-time stamp, and (if appropriate) the kiosk ID in the voucher database 612, and (iii) transmitting the voucher ID and the received date-and-time stamp via the communication link 604 to the kiosk 630.

At step 7, the kiosk 630 uses the received date-and-time stamp to retrieve the corresponding transaction ID from its local memory and transmits the voucher ID and the transaction ID via the wireless network 602 to the transaction server 620.

At step 8, the kiosk 630 starts a voucher-redemption timer having a specified duration (e.g., 3 seconds) for the new gaming voucher. If the voucher-redemption timer expires before the new gaming voucher is redeemed, then the kiosk 630 takes steps to cancel the transaction. These steps are described below with respect to steps 30-35.

At step 9, the transaction server 620 uses the transaction ID received from the kiosk 630 in step 7 to identify the corresponding transaction record in the patron's transaction ledger in the reporting database 622 and adds the received voucher ID to that transaction record.

At step 10, the transaction server 620 transmits to the cell phone 650 via the wireless network 602, a message indicating that a new gaming voucher has been successfully created for the requested transaction and that the patron needs to identify the gaming machine 640 that the patron wants to play.

At step 11, as instructed by the cell phone 650, the patron uses the cell phone 650 to read the tag ID associated with the tag 644 mounted on the gaming machine to be credited.

In a casino with many instances of the gaming machine 640, each having an instance of the BLE peripheral device 642, the cell phone 650 will simultaneously receive multiple BLE signals from nearby gaming machines 640. In order to read the tag 644 of the desired gaming machine 640, the patron places the cell phone 650 near that tag 644, thereby improving the probability that the BLE signal from the BLE peripheral device 642 of that gaming machine 640 will have a received signal strength at the cell phone 650 that is greater than the individual received signal strengths of the BLE signals from the BLE peripheral devices 642 of all of the other gaming machines 640 in the casino. When the cell phone 650 reads the tag 644, at step 12, the cell phone 650 selects the BLE signal with the strongest signal level and stores the peripheral device ID (e.g., the serial number of the BLE peripheral device 642) contained in that signal.

At step 13, the cell phone 650 transmits the tag ID, the transaction ID, and the phone ID to the transaction server 620 via the wireless network 602.

At step 14, the transaction server 620 adds the tag ID to the transaction record in the patron's transaction ledger in the reporting database 622. The transaction server 620 identifies the transaction ledger for the patron using the transaction ID and the phone ID received from the cell phone 650.

The transaction server 620 maintains a tag ID table registered by the casino, that maps tag IDs to peripheral device IDs and the type of transaction (e.g., funding a gaming machine vs. a different type of transaction). At step 15, the transaction server 620 uses the tag ID received from the cell phone 650 to access the tag ID table to determine if the type of transaction is funding a gaming machine. If so, then, at step 16, the transaction server 620 retrieves from the tag ID table, the peripheral device ID associated with the received tag ID. Note that the tag ID table also stores, for each tag, a business ID identifying the casino and an encryption key for the peripheral device 642 (if encryption is supported, as described below for step 17).

At step 17, the transaction server 620 generates a transaction package for the transaction. As used herein, the term "transaction package" is a formatted message that represents (at least) the voucher ID of the gaming voucher for the transaction. In one possible implementation, the transaction package contains the unencrypted voucher ID. In another possible implementation, the transaction package contains an encrypted value representing the voucher ID. In yet another possible implementation, the transaction package contains the unencrypted voucher ID and the unencrypted monetary value associated with that voucher ID. In a preferred implementation of FIG. 1, the transaction package is a tokenized transaction package (TTP) message that contains an encrypted value representing (at least) both the voucher ID and its monetary value. Those skilled in the art will understand how to select and apply a suitable encoding technique to generate encrypted values. Those skilled in the art will also understand that other implementations employ other suitable techniques for generating encrypted or unencrypted transaction packages. As used herein, the term "tokenized" implies that one or more sensitive data elements are represented in the TTP message by non-sensitive equivalents, referred to as tokens, that have no extrinsic or exploitable meaning or value. A token is a reference (i.e., identifier) that maps back to the sensitive data through a tokenization system. The mapping from original data to a token uses a method that renders tokens infeasible to decode in the absence of the tokenization system. In the preferred implementation of FIG. 1, tokenization is achieved using a suitable encryption technique that replaces sensitive data elements, such as the voucher ID and its corresponding monetary value, with corresponding encrypted values.

At step 18, the transaction server 620 transmits the TTP message along with the retrieved peripheral device ID to the cell phone 650 via the wireless network 602.

At step 19, the cell phone 650 compares the peripheral device ID received from the transaction server 620 to the stored peripheral device ID associated with the previously selected, strongest received BLE signal.

If there is not a match, then, at step 20, the cell phone 650 instructs the patron to move the cell phone 650 closer to the tag 644 to enable the cell phone 650 to re-select the BLE signal having the strongest received signal strength. Processing then returns to step 19. Moving the cell phone 650 closer to the tag 644 improves the probability that the strongest received BLE signal will be from the BLE peripheral device 642 of the selected gaming machine 640. The processing of steps 19 and 20 continues until the peripheral device IDs compared in step 19 match. If the IDs do not match quickly enough, then the voucher-redemption timer in the kiosk 630 will time out, the kiosk 630 will redeem the voucher (as described previously), and the cell phone 650 will instruct the patron to start over.

If and when there is a match, at step 21, the cell phone 650 establishes a Bluetooth connection with the BLE peripheral device 642 of the selected gaming machine 640 and transmits the TTP message to the BLE peripheral device 642. Note that, in some implementations, the cell phone 650 does not decrypt the TTP message. As such, neither the cell phone 650 nor the patron has access to the voucher ID.

At step 22, the BLE peripheral device 642 decrypts the received TTP message to recover the monetary value and the voucher ID.

At step 23, the BLE peripheral device 642 transmits the voucher ID and the monetary value to the gaming machine 640, which adds the monetary value to its running total of all of the recent purchases of its gaming credit.

Note that, in an alternative implementation, the bill validator of the gaming machine 640, and not the BLE peripheral device 642, decrypts the received TTP message to recover the monetary value and the voucher ID. In that case, steps 22 and 23 will instead involve the BLE peripheral device 642 transmitting the TTP message to the gaming machine's bill validator, which then decrypts the TTP message.

At step 24, the gaming machine 640 transmits the voucher ID to the ticket server 610 via the communication link 606.

At step 25, the ticket server 610 accesses the voucher database 612 to retrieve the monetary value associated with the received voucher ID, transmits the retrieved monetary value to the gaming machine 640, and updates the voucher database 612 to indicate that the voucher has been redeemed. In some implementations, updating the voucher database 612 involves deleting the voucher record from the database; in other implementations, it involves re-setting the monetary value of the voucher to be zero.

At step 26, the gaming machine 640 increases its gaming credit by the received monetary value, thereby enabling the patron to play or continue to play the gaming machine 640.

In one implementation, a transaction-funding business that operates the transaction server 620 is a check-underwriting service that keeps track of all of the different operations and gets paid off-line, as needed, by the casino and/or the different patrons. If the patron's funding source for the transaction was a credit/debit bank card, then, at step 27, the transaction server 620 communicates with the appropriate banking network 624 to reimburse the transaction-funding business that operates the transaction server 620 for paying for the gaming credit using conventional bank-to-bank ACH (automated clearing house) processing. If the patron's funding source was a different, previously created, but never redeemed gaming voucher, then, at step 28, the transaction server 620 instructs a kiosk, such as the kiosk 630, to redeem that voucher with the ticket server 610 at step 29. Note that fees may be charged by different entities to support the operations of the gaming system 600. For example, the transaction server 620 may charge a fee to the patron and/or the casino for each transaction.

When the voucher-redemption timer that was set in step 8 expires, at step 30, the kiosk 630 queries the ticket server 610 about the status of the gaming voucher, and the ticket server 610 responds by confirming whether or not the gaming voucher has been redeemed. Under normal circumstances, using processing described above, the gaming voucher will be redeemed by the gaming machine 640 well before the voucher-redemption timer times out, in which case, the ticket server 610 will respond to the kiosk 630 by indicating that the gaming voucher is has been redeemed. In that case, the kiosk 630 assumes that the gaming machine 640 properly redeemed the gaming voucher and so the kiosk 630 takes no further corrective actions.

If, however, the ticket server 610 indicates to the kiosk 630 that the gaming voucher has not been redeemed, then the kiosk 630 determines that something has gone wrong and takes action to un-do the transaction. In particular, at step 31, the kiosk 630 transmits a request to the ticket server 610 to redeem the gaming voucher, and the ticket server 610 retrieves and transmits the corresponding monetary value to the kiosk 630 and updates the voucher database 612 to indicate that the voucher has been redeemed. At step 32, the kiosk 630 then instructs the transaction server 620 to cancel or reverse the transaction. At step 33, the transaction server 620 (i) transmits a message via the wireless network 602 to the cell phone 650 indicating that the cell phone's gaming-credit purchase request has failed and (ii) updates the patron's transaction ledger accordingly. At step 34, the cell phone 650 informs the patron that the request for gaming credit has failed and (optionally) asks the patron to try again. If necessary, at step 35, the transaction server 620 also sends a message to the appropriate banking network 624 to reverse the transaction.

In one retrofit implementation, a legacy gaming system is upgraded to provide the gaming system 600 of FIG. 1, where the legacy casino system already had one or more legacy kiosks, one or more legacy gaming machines, a legacy ticket server, and a legacy voucher database, where the upgrading involves:

Modifying the software of each legacy kiosk to provide each instance of the kiosk 630 of FIG. 1;

Modifying each legacy gaming machine to provide each instance of the gaming machine 640 of FIG. 1 by (i) affixing an instance of the tag 644 to the legacy gaming machine and (ii) electrically connecting an instance of the BLE peripheral device 642 to the legacy gaming machine as described further below; and Adding the transaction server 620 and the reporting database 622 to the legacy gaming system.

Note that the hardware of the kiosk 630 does not need to be modified. Furthermore, neither the software nor the hardware of the legacy ticket server and the legacy voucher database need to be modified at all, such that the ticket server 610 is the legacy ticket server and the voucher database 612 is the legacy voucher database.

Figure 3:
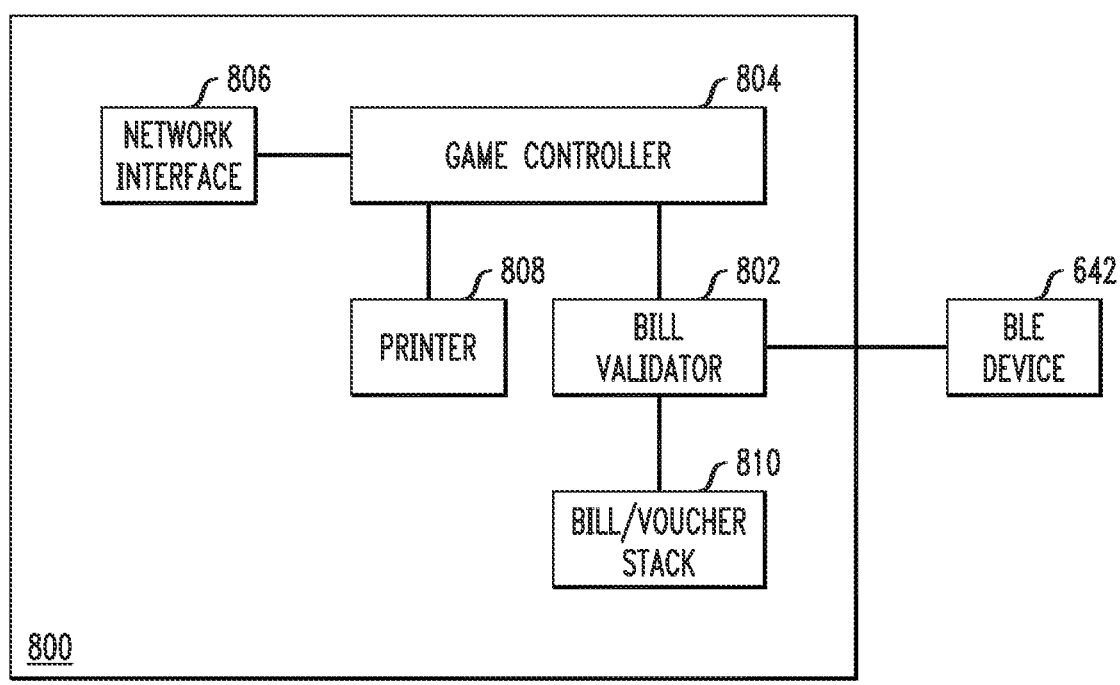
FIG. 3 is a simplified block diagram of the gaming machine of FIG. 1.

FIG. 3, which is equivalent to FIG. 8 in the '292 patent, is a simplified block diagram of the gaming machine 640 of FIG. 1. In FIG. 3, block 800 corresponds to a legacy gaming machine that was modified to provide the gaming machine 640. In one implementation, the legacy gaming machine was modified by updating the legacy bill validator and adding the BLE device 642. The updating of the legacy bill validator may involve (i) modifying the software of the legacy bill validator to provide the bill validator 802 of FIG. 3 or (ii) replacing the legacy bill validator with the bill validator 802. As represented in FIG. 3, the BLE peripheral device 642 is electrically connected to the bill validator 802. In one possible implementation, the BLE peripheral device 642 is electrically connected to the transmit wire, the receive wire, and the reference ground wire of a TTL (transistor-transistor logic) serial bus that also interconnects the game controller 804 and the bill validator 802. Note that, in some implementations, neither the hardware nor the software of any of the game controller 804, the network interface 806, and the printer 808 of the legacy gaming machine need to be modified. In an embodiment in which the legacy gaming machine already had a so-called smart bill/voucher stack that can track a running total of all of the recent purchases of gaming credit at the gaming machine, neither the hardware nor the software of the legacy bill/voucher stack need to be modified to provide the bill/voucher stack 810 of FIG. 3. Otherwise, the legacy bill/voucher stack will need to be upgraded by either modification or replacement.

As understood by those skilled in that art, the game controller 804 controls the operations of the game that is played on the gaming machine 640, the network interface 806 enables the gaming machine 640 to communicate with the ticket server 610 of FIG. 1 and possibly other nodes in the gaming system 600, the printer 808 enables the gaming machine 640 to print paper vouchers based on remaining gaming credit, and the bill validator 802 enables the gaming machine 640 to receive cash and paper vouchers to add gaming credit.

As described previously with reference to step 23, the BLE peripheral device 642 transmits the voucher ID and the monetary value to the gaming machine 640. In particular, the BLE peripheral device 642 transmits the voucher ID and the monetary value to the bill validator 802, which (i) forwards the voucher ID to the game controller 804 in a way that is identical to how a legacy bill validator would forward a voucher ID associated with a received paper voucher to a legacy game controller and (ii) forwards the monetary value to the bill/voucher stack 810 in a way that is identical to how a legacy bill validator would forward a monetary value for a received paper voucher to a legacy, smart bill/voucher stack. The game controller 804 forwards the voucher ID to the network interface 806, and the network interface 806 transmits the voucher ID to the ticket server 610 of FIG. 1, again in ways that are identical to how legacy game controllers and legacy network interfaces operate for voucher IDs of paper vouchers. Similarly, the network interface 806 receives a monetary value from the ticket server 610 and forwards that monetary value to the game controller 804, which increases its gaming credit by the monetary value, all in ways that are identical to how legacy network interfaces and legacy game controllers operate for monetary values of paper vouchers.

Note that the kiosk 630 and the gaming machine 640 still support all of the legacy functionality associated with paper vouchers, including paper-based cash-in and cash-out operations.

Although the operations of the gaming system 600 have been described in the context of the gaming machine 640 of FIGS. 1-3, which has a bill validator 802, a bill/voucher stack 810, and a printer 808, in alternative implementations, a gaming system could have one or more completely paperless gaming machines that do not have any of those three components in addition to or instead of instances of the gaming machine 640. Instead, each paperless gaming machine would have a wireless transceiver that can communicate directly with the cell phone 650 and with the game controller 804.

Although the operations of the gaming system 600 have been described in the context of funding gaming credit at gaming machines such as (without limitation) slot machines and electronic poker machines, in certain implementations, the gaming system 600 can also support funding gaming credit at gaming tables such as (without limitation) blackjack tables and roulette tables. In those implementations, the transaction server 620 is able to instruct a voucher printer (not shown in FIG. 1) located at or near a gaming table to print a paper voucher for the transaction based on the gaming voucher created by the ticket server 610. The gaming table would have a tag analogous to the gaming machine's tag 644 that the patron would read with his/her cell phone 650 to identify the gaming table to the transaction server 620. The dealer at the gaming table would redeem the paper voucher using a conventional legacy operation and provide corresponding conventional playing chips to the patron. The voucher printer may be any suitable voucher printer for casinos, including (without limitation) a suitable voucher printer from JCM American Corporation of Las Vegas, Nev.; TransAct Technologies Incorporated of Hamden, Conn.; FutureLogic, Inc., of Glendale, Calif.; or Nanoptics, Inc., of Gainesville, Fla. Note that, if the gaming table has a (wireline or wireless) smart can that can communicate directly with the transaction server, then the voucher printer and the paper voucher can potentially be omitted from this implementation while still supporting the funding of gaming credit at the gaming table using the patron's cell phone 650.

BLE Peripheral Device Slot Interface

This section provides implementation details for the slot interface of a BLE peripheral device 642 according to one possible implementation of the gaming system 600 of FIGS. 1-3. The peripheral device slot interface provides a mechanism whereby a Bluetooth-enabled cell phone 650 transmits a tokenized transaction package (TTP) message to a selected gaming machine 640, which unbundles/decrypts the TTP message and forwards the recovered voucher ID to the gaming machine's game controller 804, which follows a legacy process for redeeming gaming vouchers and driving gaming credits to the gaming machine 640. The BLE peripheral device 642 and the cell phone 650 use a suitable Bluetooth low-energy communication protocol as their wireless network technology. Data is sent and received using standard GATT (Generic Attribute Profile) services and characteristics.

As described previously, the gaming system 600 enables a casino patron to purchase a gaming voucher using the cell phone 650 and have the corresponding gaming credit applied securely to a selected gaming machine 640 without the use of a paper ticket or currency. The patron interacts with the gaming machine's BLE peripheral device 642 and the transaction server 620 using a custom application installed on the patron's BLE-enabled cell phone 650.

The BLE peripheral device 642 is connected to the gaming machine's bill validator 802 within the locked cabinet of the gaming machine 640 such that radio signals can propagate through the cabinet to and from the BLE peripheral device 642. The BLE peripheral device 642 is near other instances of the BLE peripheral device 642, which broadcast the same advertised GATT Service. The proximity of nearby BLE peripheral devices is dependent on the layout of the casino floor and the positioning of the BLE peripheral device 642 within each gaming machine cabinet.

Each instance of the BLE peripheral device 642 is registered with the transaction server 620, which stores the following information in the reporting database 622 for each instance: a business ID identifying the casino, the serial number of the BLE peripheral device 642, and an encryption key for the BLE peripheral device 642 (if encryption is supported).

The patron has registered the cell phone 650 with the transaction server 620, and the cell phone 650 is capable of receiving a valid TTP message (containing the purchased voucher ID and the associated monetary value) from the transaction server 620. As described previously, the transaction server 620 has access to the kiosk 630, which in turn has access to the ticket server 610. The location of the casino is identified via a combination of assisted GPS plus the use of BLE beacons that are placed in the areas of the casino containing instances of the gaming machine 640, each of which is equipped with a BLE peripheral device 642 connected to its bill validator 802.

When the patron uses the cell phone 650 to read the tag 644 of a particular gaming machine 640, the cell phone 650 will be physically very near the BLE peripheral device 642 of that gaming machine 640. The typical distance between the cell phone 650 and the front of the gaming machine 640 is about 6 to 8 inches, with some transactions performed with the cell phone 650 almost directly on the front of the gaming machine 640 and other transactions with the cell phone 650 as far away as 12 inches. It is not expected that any transaction will be performed with the cell phone 650 more than 24 inches from the face of the selected gaming machine 640.

Unless the BLE peripheral device 642 has been connected to a cell phone 650 and is processing a TTP message, the BLE peripheral device 642 is repeatedly advertising its service by broadcasting its unique peripheral device ID, its transmit (TX) power level, the shared 128-bit Universal Unique Identifier (UUID) for the transaction service (i.e., purchasing gaming credit), and service data. The cell phone 650 measures the power level of the received (RX) signal and compares that measured RX power level to the received TX power level to estimate the distance from the cell phone 650 to the BLE peripheral device 642. The service data includes (at least) the manufacturer code and version number for the BLE peripheral device 642.

One exception is if the cell phone 650 connects and sends invalid data to the BLE peripheral device 642 three times consecutively; at which point, the BLE peripheral device 642 shuts down for one hour, driving a legacy suspected fraud response from the gaming machine 640. If the cell phone 650 connects but no data is received within 5 seconds, then the BLE peripheral device 642 disconnects and resumes advertising. The BLE peripheral device 642 connects to only a single cell phone 650 at a time; during which, the BLE peripheral device 642 stops advertising.

The following procedure is performed each time the patron requests funds for the purpose of transferring gaming credit to a gaming machine 640. Using the gaming application on the cell phone 650, the patron selects an option to transmit to the transaction server 620 a request for a TTP message that will be used to drive gaming credit to a selected gaming machine 640. The transaction server 620 interfaces with the kiosk 630, which in turn interfaces with the ticket server 610 to purchase a gaming voucher with a corresponding monetary value. The transaction server 620 bundles the authorized gaming voucher and associated information into a TTP message that is transmitted to the cell phone 650. TTP messages are short-lived and, if not redeemed by the selected gaming machine 640 within a specified time limit, will be auto-redeemed (reversed) back into the patron's account by the kiosk 630.

The patron uses the cell phone 650 to read the tag ID of the tag 644 on the selected gaming machine 640. The cell phone 650 transmits the tag ID to the transaction server 620, which uses the tag ID to access the reporting database 622 to retrieve and transmit back to the cell phone 650, the peripheral device ID associated with that same gaming machine 640. The cell phone 640 immediately begins to scan for nearby BLE peripheral devices 642. When the cell phone 650 determines that a nearby BLE peripheral device 642 is broadcasting the correct service UUID and a peripheral device ID that matches the peripheral device ID received from the transaction server 620, the cell phone 650 transmits a connection request to establish a connection with that BLE peripheral device 642.

If an encryption key exists for the BLE peripheral device 642, then the cell phone 650 exchanges random cryptographic data with the BLE peripheral device 642 to enable the cell phone 650 and the BLE peripheral device 642 to generate respective copies of an Initialization Vector (IV) that are exchanged between the two devices to secure a connection. If an encryption key is associated with the BLE peripheral device 642, then the TTP message will be encrypted using that encryption key; otherwise, the TTP message is non-encrypted.

The cell phone 650 transmits the TTP message to the BLE peripheral device 642 by writing the TTP message to a first specified characteristic "with response." The BLE peripheral device 642 unbundles/decrypts the received TTP message to recover the voucher ID and the associated monetary value and transmits the monetary value back to the cell phone 650. Provided that the write of the TTP message is successful and the monetary value received from the BLE peripheral device 642 matches the monetary value originally requested by the cell phone 650, the cell phone 650 waits to be notified of an available response code on a second specified characteristic. The cell phone 650 continues to wait to be notified of a change in value of this response code until its length is non-zero, or until 10 seconds have elapsed. Example response codes are identified in the following table. If the BLE peripheral device 642 is not capable of sending any feedback data to the cell phone 650, then the BLE peripheral device 642 returns "00" as the default setting for the characteristic.

RESPONSE CODES

| Code | Name | Description |
| --- | --- | --- |
| 00 | Success | The voucher has the correct format, has been presented to the gaming machine for redemption, and, in some implementations, has been successfully redeemed. |
| 01 | Immediate Duplicate | The voucher is a duplicate of the immediately previous voucher, which was successfully presented and redeemed. |
| 02 | Prior Duplicate | The voucher is a duplicate of a previously redeemed voucher, but not the immediately presented and redeemed voucher. |
| 03 | Format Error | The voucher has an invalid format. |
| 04 | Not-Found Error | The voucher does not exist in the voucher database. |
| 05 | System Error | A system error was detected, and the voucher could not be presented to the gaming machine. |
| 06 | Decryption Error | A decryption error was detected when decrypting TTP message the voucher, and the voucher could not be presented to the gaming machine. |
| 99 | Other Error | An unexpected or unclassified error was encountered, and the voucher could not be presented to the gaming machine. |

After the response code is read, the cell phone 640 will issue a disconnect request to the BLE peripheral device 642, at which time, the BLE peripheral device 642 immediately begins advertising for another connection request. In some implementations, if the response code returned from the BLE peripheral device 642 is "00," then the cell phone 650 verifies that the gaming voucher has actually been redeemed by the gaming machine 640 by the cell phone 650 querying the ticket server 610 via the interface to the kiosk 630.

In some alternative embodiments, a BLE device could be connected direct to the gaming machine's interface board.

Social Distancing

As mentioned previously, the gaming system 600 and the gaming app running on the cell phone 650 of FIG. 1, which were designed to support the functionality described in the previous sections, are modified to include support of social distancing between patrons in a casino. In some implementations, to support social distancing between casino patrons, the gaming system 600 selectively and automatically controls whether the different gaming machines 640 are available or unavailable for play. For example, if a first patron is currently authorized to play at a first gaming machine, then the gaming system 600 would automatically decide that one or more nearby gaming machines are currently unavailable for play by other patrons, for example, by temporarily disabling the bill validators of those nearby gaming machines, thereby inhibiting other patrons from being physically too close to the first patron. Disabling the bill validator will prevent all forms of gaming at a gaming machine such as gaming based on cash, vouchers, and player's cards as well as gaming using a gaming app running on a cell phone. When the first patron finishes playing at the first gaming machine, the gaming system 600 would no longer prevent play at those one or more nearby gaming machines based on the first patron's play at the first gaming machine. Note that one or more of those nearby gaming machines may still be unavailable due to current play at other gaming machines. In some implementations, the gaming system 600 determines whether one gaming machine is "nearby" another gaming machine based on (i) a programmable social distance value (e.g., a specified number of feet) and (ii) knowledge of the physical layout of the gaming machines in the casino.

In certain implementations, a back-end server in the gaming system 600, such as the transaction server 620 of FIG. 1, maintains a gaming-machine database to keep track in real time of the availability and unavailability of the different gaming machines (as identified in the database by their unique tag IDs). A patron uses his/her cell phone, such as the cell phone 650 of FIG. 1, running the gaming app to determine whether or not play is available at a given gaming machine, such as the gaming machine 640 of FIG. 1. In certain implementations, the cell phone 650 scans the gaming machine's tag 644 and transmits the unique tag ID to the transaction server 620, which looks up the gaming machine in the gaming-machine database to determine whether or not the gaming machine is available for play. If the gaming machine is not available for play, e.g., due to being nearby another gaming machine that is already being played by another patron, then the transaction server 620 will transmit a message back to the cell phone 650 indicating that the gaming machine is not available for play. If the gaming machine is available for play, then the transaction server 620, the cell phone 650, and other nodes in the gaming system 600 proceed to implement the steps involved in providing the patron with gaming credit at the gaming machine 640 as described in the previous sections. In addition, the transaction server 620 updates the gaming-machine database to indicate that the particular gaming machine 640 is currently being played and that the one or more nearby gaming machines are currently unavailable for play.

In some implementations, to assist patrons in determining whether or not gaming machines are available for play, each gaming machine 640 is aware of whether or not it is available for play based on back-end messaging received from the transaction server 620. Each gaming machine 640 will intermittently transmit via its BLE device 642 a wireless BLE message indicating whether or not it is available for play. The range of BLE communications between a BLE device 642 and a cell phone 650 may be up to about 30 meters. Since there may be many gaming machines within 30 meters of the cell phone 650, the cell phone 650 can be configured to use BLE signal strength to select only those BLE messages having signal strengths greater than some specified threshold level, which selected BLE messages will typically correspond to the gaming machines that are closest to the cell hone 650.

For those selected BLE messages, the cell phone 650 will determine whether those BLE messages come from gaming machines 640 that are available or unavailable for play. If all of the selected BLE messages are from available gaming machines, then the cell phone 650 will indicate, e.g., by displaying corresponding information on the cell phone's screen, such as a green light, that all of the nearby gaming machines are available for play. If, however, all of the selected BLE messages are from unavailable gaming machines, then the cell phone 650 will indicate, e.g., by displaying corresponding information on the cell phone's screen such as a red light, that none of the nearby gaming machines are available for play. If the selected BLE messages indicate the presence of both available and unavailable gaming machines, then the cell phone 650 will indicate, e.g., by displaying corresponding information on the cell phone's screen such as a yellow light, that only a subset of the nearby gaming machines are available for play. As such, as the patron walks up and down the aisles adjacent to the rows of gaming machines 640, the cell phone 650 will provide some indication, such as a colored heat map, of the availability of nearby gaming machines for play.

In some implementations, the different gaming machines 640 are able to indicate whether or not they are available for play, e.g., by displaying corresponding information on the gaming machine's screen or turning on or off appropriate lights on the gaming machine.

In some implementations, the gaming system 600 logically disables and enables gaming machines for play. In other implementations, the gaming system 600 physically disables and enables gaming machines for play by controlling gaming machine's electronic hardware (e.g., the bill validator or the SAS controller).

Alternatively or in addition, as described further in the next section, a gaming app running on a cell phone could control which gaming machines are available, for example, by communicating directly with the BLE devices of neighboring gaming machines to cause them to disable their bill validators. Another possibility is to have a central cloud-based solution that determines the availability of gaming machines based on phone-to-phone-to-BLE-device communications. For example, when a patron uses his cell phone to secure play at a particular gaming machine, a centralized server (separate from the gaming system 600) transmits the ID numbers for gaming machines that are nearby the particular gaming machine to the patron's cell phone, which can then transmit BLE messages instructing those nearby gaming machines to disable their bill validators. Alternatively, the server could transmit the ID numbers to the particular gaming machine, which would then instruct those nearby gaming machines to disable their bill validators by having the BLE device of the particular gaming machine transmit BLE messages to the BLE devices of those nearby gaming machines.

Social Grouping

In some embodiments, in addition to supporting the concept of social distancing as described in the previous section, the gaming system 600 of FIG. 1 also supports the concept of social grouping, where each social group includes two or more patrons (e.g., relatives or friends) for whom the social distancing constraint described in the previous section is waived. As such, the gaming system 600 will allow two or more patrons within the same social group to play at gaming machines 640 without restricting the distance between those patrons. For example, if a first patron is authorized to play at a first gaming machine, then the gaming system 600 will not automatically prevent a second patron, who is in the first patron's social group, from playing at a nearby, second gaming machine. Note that the second patron may still be prevented from playing at the second gaming machine if that machine is too close to a third gaming machine being played by a third patron who is not in the first and second patron's social group. In some implementations, a first patron may use his gaming app to identify specific other patrons as being part of the first patron's social group, thereby enabling those other patrons to play at neighboring gaming machines. This feature of allowing neighbor play could be achieved via Playerclub service window from the gaming system providers through some patron interface interaction. For example, a gaming machine could provide the patron with an option to make neighboring gaming machines unavailable as long as the patron has credits in play, where, depending on the particular implementation, the patron could select that option either via his cell phone or directly at the gaming machine.

In some implementations, to support social grouping, the transaction server 620 uses the gaming-machine database to keep track of the identity of each patron currently playing at a gaming machine. The transaction server 620 also maintains a social-group database to keep track of the members of each different social group. Note that social groups are typically defined by patrons using the gaming apps on their cell phones 650 and then used in real-time by the transaction server 620 to determine whether to allow two or more patrons to play at nearby gaming machines.

In some implementations, a first patron becomes authorized to play at a first gaming machine 640 using the functionality described in the previous section (with the addition of the transaction server 620 receiving the identity of the first patron (e.g., the first patron's cell phone ID) from the cell phone 650 and recording the patron's identity in the gaming-machine database). A second patron then uses his/her cell phone 650 to scan the tag 644 of a nearby, second gaming machine 640 and transmit a message to the transaction server 620 identifying both the second gaming machine and the second patron. The transaction server 620 initially accesses the gaming-machine database to determine that the second gaming machine 640 is identified as being currently unavailable for play due to its proximity to the first gaming machine. The transaction server 620 then accesses the social-group database to determine whether or not the second patron is in the same social group as the first patron. If not, then the transaction server 620 will transmit a message to the second patron's cell phone 650 indicating that the second gaming machine is not available for play. If, however, the transaction server 620 determines that the first and second patrons are in the same social group, then the transaction server 620, the cell phone 650, and other nodes in the gaming system 600 proceed to implement the steps involved in providing the second patron with gaming credit at the second gaming machine 640 as described previously. In addition, the transaction server 620 updates the gaming-machine database to indicate (i) that the second gaming machine 640 is currently being played and (ii) if appropriate, that one or more additional gaming machines that happen to be nearby the second gaming machine, but not the first gaming machine, are currently unavailable for play. As mentioned before, in some implementations, the first patron is able to identify other patrons as being in the first patron's social group, thereby enabling those other patrons to play at neighboring gaming machines.

In this way, multiple patrons who are members of the same social group and, in theory, less likely to need social distancing from one another, can enjoy playing at nearby gaming machines.

In some implementations, when a first patron of a particular social group becomes authorized play at a particular gaming machine, the gaming system 600 could transmit invitations to the other members of that social group to (i) join the first patron at that gaming machine and/or (ii) play at nearby gaming machines.

Note that, in some implementations, a patron may simultaneously be a member of two or more different social groups. Depending on the implementation, the gaming system 600 may allow such a patron to play at gaming machines nearby other members of those different social groups without necessarily allowing different members in those different social groups to play at nearby gaming machines. In other words, if a first social group includes Patrons A and B, but not Patron C, and if a second social group includes Patrons A and C, but not Patron B, then Patrons A and B can play at nearby gaming machines and Patrons A and C can play at nearby gaming machines, but Patrons B and C might not be allowed to play at nearby gaming machines.

In certain implementations, social groups may be dynamic. For example, the gaming app and/or the gaming system 600 may be able to set time limits for the memberships of individual members of social groups and/or for the entire social group, where the corresponding membership would automatically end at the expiration of a time limit, unless the time limit were manually extended. Furthermore, the gaming app may display options that enable a designated leader of a social group or any member of the social group to add new members to the social group in real time. The gaming app and/or the gaming system 600 may set a maximum limit on the number of members of a social group and/or a maximum number of members that are allowed to be present within a given area.

As described above, in some implementations, backend servers of the gaming system 600 manage the execution of social distancing and social grouping. In some implementations, in addition or instead, the execution of social distancing and social grouping is managed directly by the gaming apps running on patrons' cell phones without directly involving those backend servers. In those implementations, the gaming machines are configured to communicate directly with the gaming apps to prevent gaming at neighboring gaming machines except by members of the same social group.

FIG. 7 is a flow diagram of the processing performed according to one possible implementation of social distancing. In step 702, a first patron (Patron A) uses his cell phone (Phone A) running a gaming app to scan the QR code associated with an available gaming machine (Machine A) and secure play at Machine A, for example, using the processing described previously with respect to FIGS. 1-3 above or the processing described below with respect to FIGS. 4-6.

In step 704, Phone A broadcasts a BLE "disable-BV" message instructing all gaming machines that receive that BLE message to disable their bill validators. The disable-BV message includes a unique identifier for Phone A. In response, in step 706, each neighboring gaming machine whose BLE device receives the disable-BV message will disable its bill validator and set a disable-BV timer for a preprogrammed period of time. While the bill validator of a gaming machine is disabled, that gaming machine cannot be played. Note that, using the cell-phone identifier in the disable-BV message, Machine A determines that it should not disable its bill validator because Machine A knows that it has been authorized to play by Phone A.

Note that, as long as Patron A continues to play at Machine A, Phone A periodically transmits the disable-BV message, and the neighboring gaming machines respond by resetting their disable-BV timers. In step 708, when Patron A cashes out from Machine A (or otherwise stops playing at Machine A), the BLE device of Machine A transmits a "stop-sending-disable-BV" message with the cell-phone identifier of Phone A in step 710, and, in response, Phone A stops transmitting the disable-BV messages.

In that case, in step 712, the disable-BV timer in each neighboring gaming machine will eventually time out, and, in step 714, each neighboring gaming machine will re-enable its bill validator to once again enable play by patrons.

FIG. 8 is a flow diagram of the processing performed according to one possible implementation of social grouping. In this implementation, each cell phone stores a list of the cell phone identifiers of those patrons who are in the same social group as the owner of the cell phone. The processing of FIG. 8 occurs after step 702 of FIG. 7, but before step 708 of FIG. 7, while Patron A is still playing at Machine A.

In step 802, another patron (Patron B) uses her cell phone (Phone B) to scan the QR code of a disabled neighboring gaming machine (Machine B) whose bill validator was disabled due to Patron A playing at Machine A in an attempt to secure play at Machine B, for example, using the processing described previously with respect to FIGS. 1-3 above or the processing described below with respect to FIGS. 4-6.

In step 804, since the bill validator of Machine B is disabled as a result of Machine B previously having received a disable-BV message from Phone A (in step 706 of FIG. 7), the BLE device of Machine B transmits a "social group" query message to Phone B identifying Phone A and asking the gaming app on Phone B whether Patron A is in the same social group as Patron B. In response, in step 806, the gaming app on Phone B accesses the locally stored social-group listing to determine whether Patron A is in Patron B's social group. If so, then, in step 808, Phone B transmits a positive response message to the BLE device of Machine B informing Machine B that Patron A is in Patron B's social group. As such, in step 810, Machine B re-enables its bill validator to enable Patron B to play at Machine B and, in step 812, Phone B broadcasts a disable-BV message to instruct nearby gamine machines (which might include gaming machines that are not nearby Machine A) to disable their bill validators, as in steps 704 et seq. of FIG. 7.

If, however, in step 806, the gaming app on Phone B determines that Patron A is not in Patron B's social group, then, in step 814, Phone B transmits a negative response message to the BLE device of Machine B informing Machine B that Patron A is not in Patron B's social group. As such, in step 816, Machine B keeps its bill validator invalidated to prevent Patron B from playing at Machine B.

Note that, if Machine B had previously received disable-BV messages from multiple nearby gaming machines (e.g., Machine A and Machine C, where Machines A and C are both neighbors of Machine B, but not of each other), then the query transmitted in step 804 would have to identify both Machine A and Machine C, and Phone B would have to determine that both Patrons A and C are in Patron B's social group in step 806 before Phone B will transmit a positive response in step 808.

In some implementations, in addition to or instead of Machine B querying Phone B about Patron A, Machine B transmits a BLE message to Phone A asking Patron A for permission to allow Patron B to play at Machine B. If Patron A agrees, then Phone A transmits a positive response back to Machine B, which then re-enables its bill validator to enable Patron B to play at Machine B.

Social Distancing and Social Grouping at Table Games

Social distancing and social grouping can also be applied in a casino at gaming tables such as poker/blackjack tables, roulette tables, craps tables, and baccarat tables. For example, individual gaming tables can be designated for play only by members of a single social group. Certain types of tables, such as craps tables, may be able to be played by members of multiple social groups, for example, with members of one social group restricted to stand on one side of a craps table and members of a different social group restricted to stand on the other side of the craps table.

In some implementations, a patron may use the gaming app on his/her cell phone to reserve play at a gaming table for the patron's social group, possibly with a reservation fee being charged to the patron and/or divvied up among the patron's social group. When a first patron of a particular social group reserves play at a particular gaming table, the gaming system 600 could transmit invitations to the other members of that social group to join the first patron at that gaming table at the reservation time.

In some implementations, each gaming table (or each side of a craps table) would have a BLE device, analogous to the BLE device 642 of FIG. 1, and/or a tag, analogous to the tag 644 of FIG. 1. A patron would determine whether play was available at a particular gaming table by scanning the tag with their cell phone, which would communicate with the transaction server 620 of FIG. 1 as described previously either to grant or deny permission to play at that gaming table. The BLE device, which would be connected to the back end of the gaming system 600, would communicate with the patron's cell phone as described previously to enable funding of play at the gaming table by the patron. If a gaming table were reserved for play by the patron or by a different patron in the same social group, then permission to play would be granted. If a gaming table were already reserved for play by a patron of a different social group, then permission to play would be denied.

Similar to what was described previously, the gaming app on the patron's cell phone could provide an indication to the patron of the availability of nearby gaming tables for play as the patron moves within the casino.

Alternative Casino System with Tokenized Transaction Packages

Figure 4:
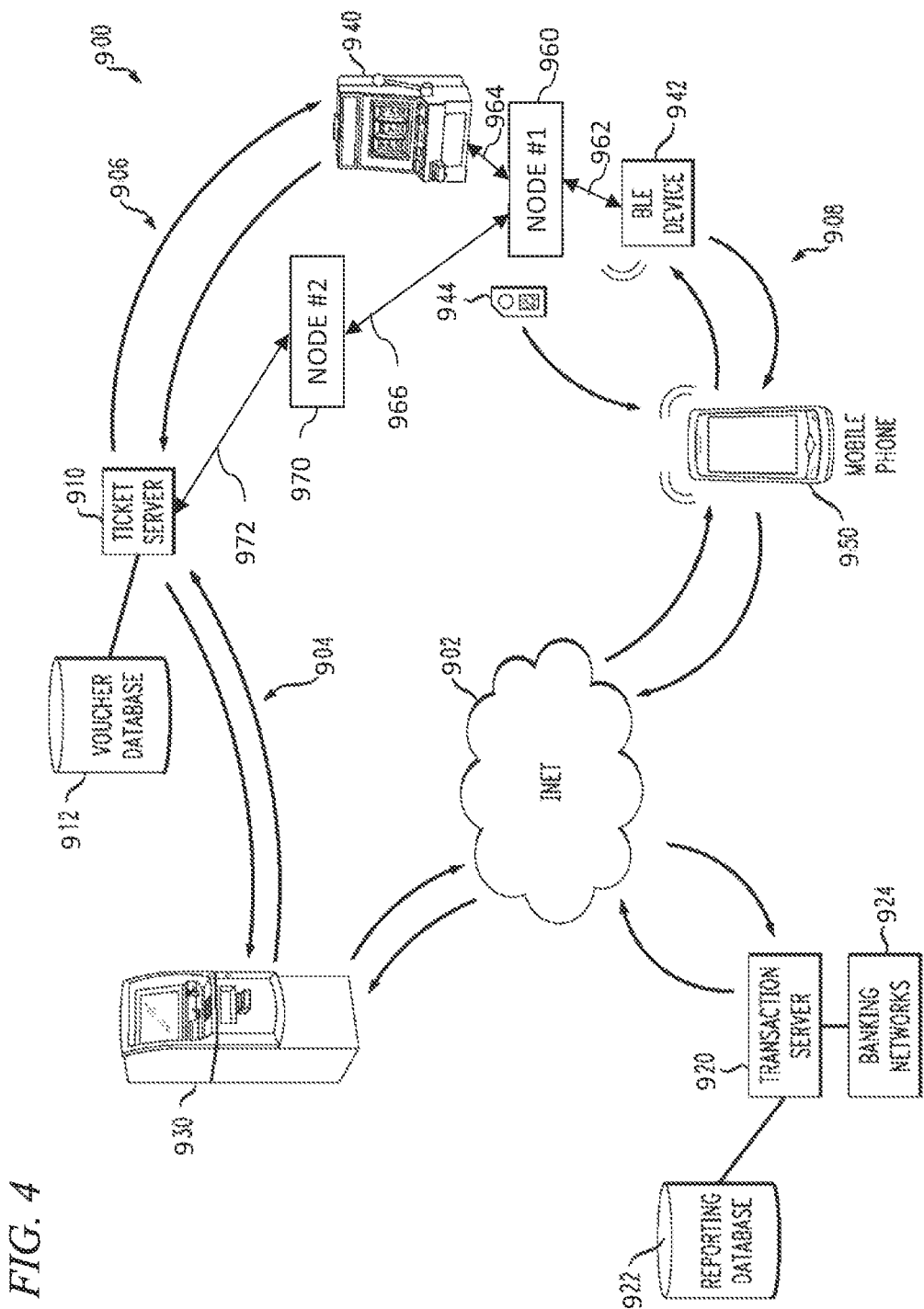
FIG. 4 shows a symbolic diagram representing a distributed gaming system for a casino or other suitable gaming establishment that supports gaming vouchers, according to another possible embodiment.

FIG. 4, which is equivalent to FIG. 9 in the '899 application, shows a symbolic diagram representing a distributed gaming system 900 for a casino or other suitable gaming establishment that supports gaming vouchers, according to another possible embodiment. The elements 902-950 of the gaming system 900 of FIG. 4 are analogous to the corresponding elements 602-650 of the gaming system 600 of FIG. 1. Except as explicitly identified below, the teachings provided above for elements 602-650 also apply to elements 902-950.

In addition to those analogous elements, the gaming system 900 of FIG. 4 also includes a first node 960 and a second node 970. As shown in FIG. 4, the first node 960 communicates (i) with the BLE device 942 via communication link 962, (ii) with the gaming machine 940 via communication link 964, and (iii) with the second node 970 via communication link 966. In addition, the second node 970 also communicates with the ticket server 910 via communication link 972. In one implementation, each of communication links 962, 964, 966, and 972 is a suitable wired communication link, although, in other implementations, one or more of those communications paths may be a suitable wireless communication link.

As described above with respect to FIG. 3, in the gaming system 600 of FIG. 1, a legacy gaming machine or a new OEM gaming machine has a BLE device 642 hardwired to the gaming machine's bill validator 802 to support communications between the mobile phone 650 and the gaming machine's game controller 804 via the BLE device 642. As described below with respect to FIG. 6, in the gaming system 900 of FIG. 4, the mobile phone 950 communicates with the BLE device 942 via the wireless BLE communication link 908, and the first node 960 communicates with a SAS (serial attached SCSI (small computer system interface)) interface in the gaming machine 940. Note that, in the gaming system 900 of FIG. 4, the BLE device 942 is not hardwired directly to the gaming machine 940.

Note that, in some implementations, there is one instance of the BLE device 942 and one instance of the first node 960 for each gaming machine 940, but there is one instance of the second node 970 for each bank of (e.g., eight) gaming machines 940, where the second node 970 aggregates and distributes the communications between the corresponding plurality of first nodes 960 and the ticket server 910. Note that, in other implementations in which there is one instance of the second node 970 for each gaming machine 940, the functionality of the first and second nodes 960 and 970 can be combined into a single node having communication links with the BLE device 942, the gaming machine 940, and the ticket server 910.

Figure 5:
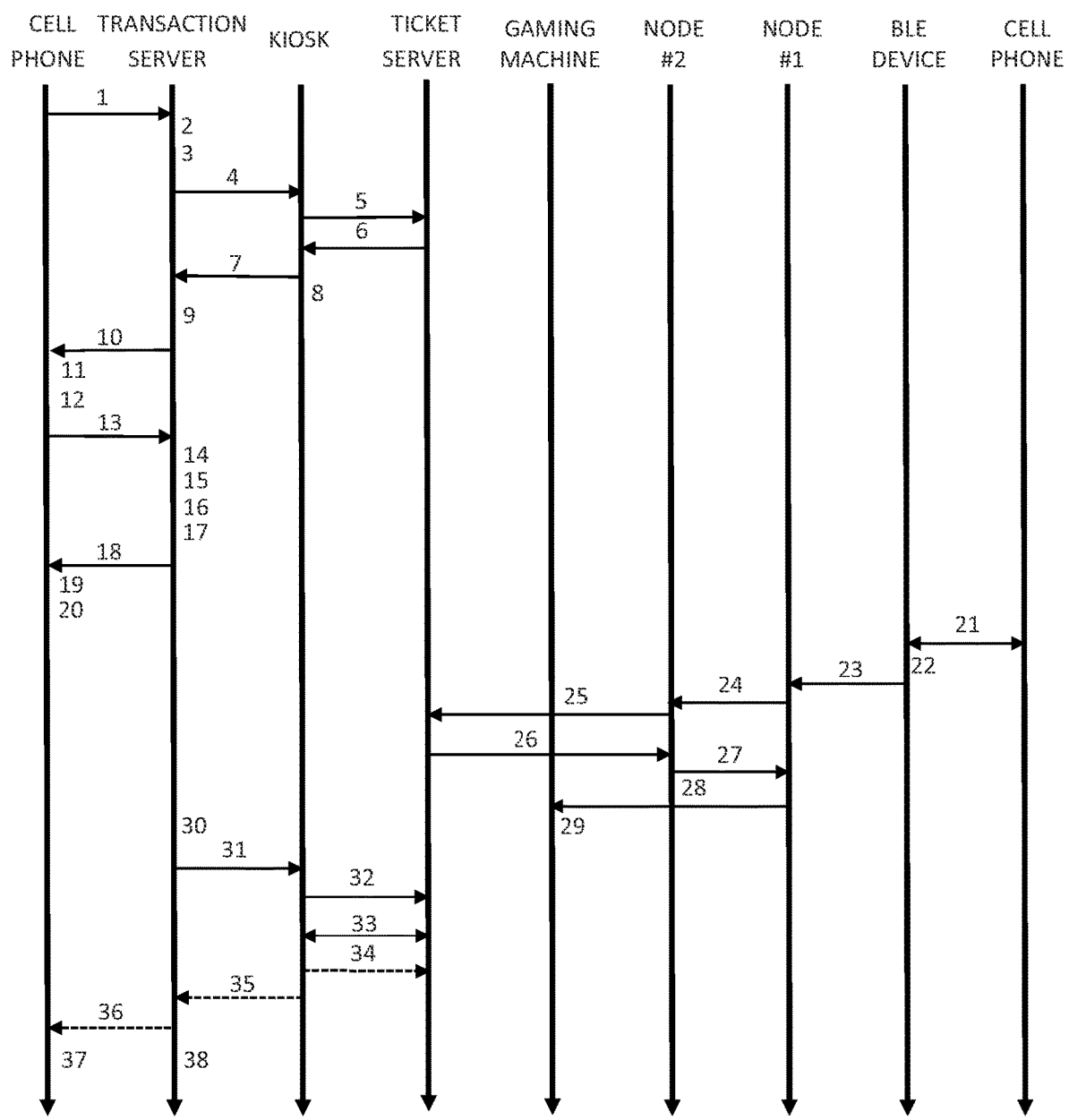
FIG. 5 is a diagram representing the steps involved in the purchase by a patron of gaming credit at the gaming machine of the gaming system of FIG. 4, according to one possible implementation.

FIG. 5, which is equivalent to FIG. 10 in the '899 application, is a diagram representing the steps involved in the purchase by a patron of gaming credit at the gaming machine 940 of the gaming system 900 of FIG. 4, according to one possible implementation. Steps 1-20 of FIG. 5 for the gaming system 900 of FIG. 4 are identical to steps 1-20, respectively, of FIG. 2 for the gaming system 600 of FIG. 1.

If and when there is a match at step 19, then, at step 21, the cell phone 650 establishes a Bluetooth connection with the BLE peripheral device 942 associated with the selected gaming machine 940 and transmits the TTP message to the BLE peripheral device 942 via the communication link 908. Note that the cell phone 950 does not decrypt the TTP message. As such, neither the cell phone 950 nor the patron has access to the voucher ID.

At step 22, the BLE peripheral device 942 decrypts the received TTP message to recover the monetary value and the voucher ID.

At step 23, the BLE peripheral device 942 transmits the voucher ID and the monetary value to the first node 960 via the communication link 962.

At step 24, the first node 960 transmits the voucher ID and the monetary value to the second node 970 via the communication link 966.

At step 25, the second node transmits the voucher ID and the monetary value to the ticket server 910 via the communication link 972.

Note that, in an alternative implementation, the first node 960, and not the BLE peripheral device 942, decrypts the received TTP message. In that case, steps 22 and 23 will instead involve the BLE peripheral device 942 transmitting the TTP message to the first node 960, which then decrypts the TTP message. In another alternative implementation, the second node 970, and not the BLE peripheral device 942 or the first node 960, decrypts the received TTP message. In that case, steps 22-24 will instead involve the BLE peripheral device 942 transmitting the TTP message to the first node 960, which then transmits the TTP message to the second node 970, which then decrypts the TTP message.

Note that, in alternative implementations, whichever element decodes the TTP message, that element recovers only the voucher ID, where the voucher ID, but not the monetary value, is then transmitted to the ticket server 910.

At step 26, the ticket server 910 accesses the voucher database 912 to retrieve the monetary value associated with the received voucher ID and transmits the retrieved monetary value to the second node 970 via the communication link 972.

At step 27, the second node 970 transmits the retrieved monetary value to the first node 960 via the communication link 966.

At step 28, the first node 960 transmits the retrieved monetary value to the gaming machine 940 via the communication link 964 as an electronic funds transfer (EFT).

At step 29, the gaming machine 940 increases its gaming credit by the received monetary value, thereby enabling the patron to play or continue to play the gaming machine 940.

Steps 30-38 of FIG. 5 for the gaming system 900 of FIG. 4 are identical to steps 27-35, respectively, of FIG. 2 for the gaming system 600 of FIG. 1.

In one retrofit implementation, a legacy gaming system is upgraded to provide the gaming system 900 of FIG. 4, where the legacy casino system already had one or more legacy kiosks, one or more legacy gaming machines, a legacy ticket server, and a legacy voucher database, where the upgrading involves:

Modifying the software of each legacy kiosk to provide each instance of the kiosk 930 of FIG. 4;
Modifying each legacy gaming machine to provide each instance of the gaming machine 940 of FIG. 4 by (i) affixing an instance of the tag 944 to the legacy gaming machine and (ii) electrically connecting an instance of the first node 960 to the legacy gaming machine as described further below;
Providing an instance of the BLE device 942 for each gaming machine 940;
Providing an instance of the second node 960 for each bank of gaming machines 940; and
Adding the transaction server 920 and the reporting database 922 to the legacy gaming system.

Note that the hardware of the legacy kiosk does not need to be modified. Furthermore, neither the software nor the hardware of the legacy ticket server and the legacy voucher database need to be modified at all, such that the ticket server 910 is the legacy ticket server, and the voucher database 912 is the legacy voucher database.

FIG. 6, which is equivalent to FIG. 11 in the '899 application, is a simplified block diagram of the gaming machine 940 of FIG. 4 along with the BLE device 942 and the first node 960. In FIG. 6, the gaming machine 940 is a legacy gaming machine, where elements 1102-1110 are analogous to the corresponding elements 802-810 of FIG. 3, except that the bill validator 1102 is not directly connected to the BLE device 942. Instead, as shown in FIG. 6, the first node 960 is connected to a SAS interface 1112 of the gaming machine's game controller 1104 via the communication link 964, and the BLE device 942 is connected to the first node 960 via the communication link 962. Although not shown in FIG. 6, as shown in FIG. 4, the first node 960 is also connected to the second node 970 via the communication link 966, and the BLE device 942 is also connected to the mobile phone 950 via the BLE communication link 908.

In one implementation, the legacy gaming machine was modified by connecting the first node 960 to the SAS interface node 1114 of the game controller 1104 of the legacy gaming machine. Note that, in some implementations, neither the hardware nor the software of any of the bill validator 1102, the game controller 1104, the network interface 1106, the printer 1108, and the bill/voucher stack 1110 of the legacy gaming machine needs to be modified.

As described previously with reference to step 28, the first node 960 transmits the monetary value of the voucher to the gaming machine 940 as an EFT. In particular, the first node 960 transmits the monetary value to the game controller 1104 via the SAS interface 1112, and the game controller 1104 forwards the monetary value to the bill/voucher stack 1110 via the bill validator 1102 in a way that is identical to how a legacy bill validator 1102 would forward an EFT to a legacy, smart bill/voucher stack.

Note that the kiosk 930 and the gaming machine 940 still support all of the legacy functionality associated with paper vouchers, including paper-based cash-in and cash-out operations. Although the operations of the gaming system 900 have been described in the context of the gaming machine 940 of FIGS. 4-6, which has a bill validator 1102, a bill/voucher stack 1110, and a printer 1108, in alternative implementations, a gaming system could have one or more completely paperless gaming machines that do not have any of those three components in addition to or instead of instances of the gaming machine 940. Instead, each paperless gaming machine would have a wireless transceiver that can communicate directly with the cell phone 950 and with the game controller 1104.

Those skilled in the art will understand that the gaming system 900 and the gaming app running on the cell phone 950 of FIG. 4, as described in the '899 application, can be modified to support both the social distancing and the social grouping described in previous sections.

In some embodiments, a method is for implementing social distancing at a gaming establishment having a plurality of gaming machines. The method comprises (i) enabling a first patron to play at a first gaming machine and (ii) disabling one or more neighboring gaming machines that are nearby the first gaming machine from being played while the first patron is playing at the first gaming machine.

In at least some of the above embodiments, a gaming system of the gaming establishment enables the first patron to play at the first gaming machine based on receipt of a request from the first patron using a gaming app running on a first wireless device.

In at least some of the above embodiments, a BLE device of the first gaming machine communicates with the first wireless device.

In at least some of the above embodiments, a neighboring gaming machine is disabled from being played by temporarily disabling a bill validator of the neighboring gaming machine.

In at least some of the above embodiments, a gaming system of the gaming establishment disables the one or more neighboring gaming machines from being played.

In at least some of the above embodiments, each neighboring gaming machine is disabled from being played upon receipt of a disable message from a first wireless device of the first patron.

In at least some of the above embodiments, each disabled neighboring gaming machine sets a timer such that (i) the disabled neighboring gaming machine re-sets the timer upon receipt of a subsequent disable message from the first wireless device and (ii) the disabled neighboring gaming machine re-enables itself upon expiration of the timer.

In at least some of the above embodiments, each neighboring gaming machine is disabled from being played upon receipt of a disable message from the first gaming machine.

In at least some of the above embodiments, the method further comprises, while the first patron is playing at the first gaming machine, enabling a second patron who is in a social group with the first patron to play at one of the one or more neighboring gaming machines.

In at least some of the above embodiments, when the second patron attempts to play at the neighboring gaming machine using a second wireless device, a gaming system of the gaming establishment determines whether the second patron is in the social group with the first patron.

In at least some of the above embodiments, when the second patron attempts to play at the neighboring gaming machine using a second wireless device, the neighboring gaming machine queries at least one of the first wireless device and the second wireless device to determine whether the second patron is in the social group with the first patron.

In some embodiments, a gaming machine is for a gaming establishment having a plurality of gaming machines. The gaming machine comprises (i) a game controller configured to control the gaming machine, (ii) a bill validator connected to the game controller and configured to enable a first patron to pay to play at the gaming machine, and (iii) a wireless communication component connected to at least one of the game controller and the bill validator and configured to communicate with a first wireless device of the first patron. The bill validator is configured to be temporarily disabled when a neighboring gaming machine is being played by a second patron.

In at least some of the above embodiments, the wireless communication component is a BLE device.

In at least some of the above embodiments, the gaming machine is enabled to be played by the first patron by a gaming system of the gaming establishment based on receipt of a request from the first patron using a gaming app running on the first wireless device.

In at least some of the above embodiments, the bill validator is configured to be temporarily disabled by a gaming system of the gaming establishment.

In at least some of the above embodiments, the bill validator is configured to be temporarily disabled upon receipt by the wireless communication component of a disable message from a wireless device of a patron.

In at least some of the above embodiments, the game controller is configured to set a timer upon receipt by the wireless communication component of the disable message such that (i) the game controller is configured to re-set the timer upon receipt of a subsequent disable message and (ii) the game controller is configured to re-enable the bill validator upon expiration of the timer.

In at least some of the above embodiments, the bill validator is configured to be temporarily disabled upon receipt by the wireless communication component of a disable message from the neighboring gaming machine's wireless communication component.

In at least some of the above embodiments, at least one of the game controller and the wireless communication component is configured to enable the bill validator to enable the first patron to play at the gaming machine when the second patron is playing at the neighboring gaming machine when the first patron is in a social group with the second patron.

In at least some of the above embodiments, the game controller is configured to receive an instruction to enable the bill validator from a gaming system of the gaming establishment that is configured to determine whether the first patron is in the social group with the second patron.

In at least some of the above embodiments, when the first patron attempts to play at the gaming machine using the first wireless device, the gaming machine is configured to query at least one of the first wireless device and the second wireless device to determine whether the first patron is in the social group with the second patron.

Embodiments of the invention can be manifest in the form of methods and apparatuses for practicing those methods. Embodiments of the invention can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. Embodiments of the invention can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical reading of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art.

In this specification, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A method for implementing social distancing at a gaming establishment having a plurality of gaming machines, the method comprising:
    enabling a first patron to play at a first gaming machine; and
    disabling one or more neighboring gaming machines that are nearby the first gaming machine from being played while the first patron is playing at the first gaming machine upon each neighboring gaming machine receiving a disable message directly from a first wireless device of the first patron.

2. The method of claim 1, wherein a gaming system of the gaming establishment enables the first patron to play at the first gaming machine based on receipt of a request from the first patron using a gaming app running on a first wireless device.

3. The method of claim 2, wherein a BLE device of the first gaming machine communicates with the first wireless device.

4. The method of claim 1, wherein a neighboring gaming machine is disabled from being played by temporarily disabling a bill validator of the neighboring gaming machine.

5. The method of claim 1, wherein each disabled neighboring gaming machine sets a timer such that (i) the disabled neighboring gaming machine re-sets the timer upon receipt of a subsequent disable message from the first wireless device and (ii) the disabled neighboring gaming machine re-enables itself upon expiration of the timer.

6. The method of claim 1, further comprising:
    while the first patron is playing at the first gaming machine, enabling a second patron who is in a social group with the first patron to play at one of the one or more neighboring gaming machines.

7. The method of claim 6, wherein:
    when the second patron attempts to play at the neighboring gaming machine using a second wireless device, a gaming system of the gaming establishment determines whether the second patron is in the social group with the first patron.

8. The method of claim 6, wherein:
    when the second patron attempts to play at the neighboring gaming machine using a second wireless device, the neighboring gaming machine queries at least one of the first wireless device and the second wireless device to determine whether the second patron is in the social group with the first patron.

9. A gaming machine for a gaming establishment having a plurality of gaming machines, the gaming machine comprising:
a game controller configured to control the gaming machine;
a bill validator connected to the game controller and configured to enable a first patron to pay to play at the gaming machine; and
a wireless communication component connected to at least one of the game controller and the bill validator and configured to communicate with a first wireless device of the first patron, wherein:
the bill validator is configured to be temporarily disabled when a neighboring gaming machine is being played by a second patron; and
the bill validator is configured to be temporarily disabled upon receipt by the wireless communication component of a disable message from a wireless device of a patron.

10. The gaming machine of claim 9, wherein the wireless communication component is a BLE device.

11. The gaming machine of claim 9, wherein the gaming machine is enabled to be played by the first patron by a gaming system of the gaming establishment based on receipt of a request from the first patron using a gaming app running on the first wireless device.

12. The gaming machine of claim 9, wherein the game controller is configured to set a timer upon receipt by the wireless communication component of the disable message such that (i) the game controller is configured to re-set the timer upon receipt of a subsequent disable message and (ii) the game controller is configured to re-enable the bill validator upon expiration of the timer.

13. The gaming machine of claim 9, wherein at least one of the game controller and the wireless communication component is configured to enable the bill validator to enable the first patron to play at the gaming machine when the second patron is playing at the neighboring gaming machine when the first patron is in a social group with the second patron.

14. The gaming machine of claim 13, wherein the game controller is configured to receive an instruction to enable the bill validator from a gaming system of the gaming establishment that is configured to determine whether the first patron is in the social group with the second patron.

15. The gaming machine of claim 13, wherein:
when the first patron attempts to play at the gaming machine using the first wireless device, the gaming machine is configured to query at least one of the first wireless device and the second wireless device to determine whether the first patron is in the social group with the second patron.

16. A method for implementing social distancing at a gaming establishment having a plurality of gaming machines, the method comprising:
enabling a first patron to play at a first gaming machine;
disabling one or more neighboring gaming machines that are nearby the first gaming machine from being played while the first patron is playing at the first gaming machine; and
while the first patron is playing at the first gaming machine, enabling a second patron who is in a social group with the first patron to play at one of the one or more neighboring gaming machines.

17. The method of claim 16, wherein:
when the second patron attempts to play at the neighboring gaming machine using a second wireless device, a gaming system of the gaming establishment determines whether the second patron is in the social group with the first patron.

18. The method of claim 16, wherein:
when the second patron attempts to play at the neighboring gaming machine using a second wireless device, the neighboring gaming machine queries at least one of the first wireless device and the second wireless device to determine whether the second patron is in the social group with the first patron.

19. A gaming machine for a gaming establishment having a plurality of gaming machines, the gaming machine comprising:
a game controller configured to control the gaming machine;
a bill validator connected to the game controller and configured to enable a first patron to pay to play at the gaming machine; and
a wireless communication component connected to at least one of the game controller and the bill validator and configured to communicate with a first wireless device of the first patron, wherein:
the bill validator is configured to be temporarily disabled when a neighboring gaming machine is being played by a second patron; and
at least one of the game controller and the wireless communication component is configured to enable the bill validator to enable the first patron to play at the gaming machine when the second patron is playing at the neighboring gaming machine when the first patron is in a social group with the second patron.

20. The gaming machine of claim 19, wherein the game controller is configured to receive an instruction to enable the bill validator from a gaming system of the gaming establishment that is configured to determine whether the first patron is in the social group with the second patron.

21. The gaming machine of claim 19, wherein:
when the first patron attempts to play at the gaming machine using the first wireless device, the gaming machine is configured to query at least one of the first wireless device and the second wireless device to determine whether the first patron is in the social group with the second patron.

* * * * *